United States Patent
Hori et al.

(10) Patent No.: US 6,911,798 B2
(45) Date of Patent: Jun. 28, 2005

(54) ROTATION ANGLE DETECTING APPARATUS FOR SYNCHRONOUS ROTARY ELECTRIC MACHINE

(75) Inventors: Masashi Hori, Nukata-gun (JP); Kiyoshi Kimura, Kariya (JP); Shigeru Kamio, Nagoya (JP); Yasuhiro Nakai, Kariya (JP)

(73) Assignees: Nippon Soken, Inc., Nishio (JP); DENSO Corporation, Kariya (JP)

( * ) Notice: Subject to any disclaimer, the term of this patent is extended or adjusted under 35 U.S.C. 154(b) by 57 days.

(21) Appl. No.: 10/445,015

(22) Filed: May 27, 2003

(65) Prior Publication Data
US 2003/0227287 A1 Dec. 11, 2003

(30) Foreign Application Priority Data
Jun. 6, 2002 (JP) ....................................... 2002-166198

(51) Int. Cl.[7] .............................................. G05B 19/29
(52) U.S. Cl. ........................................ 318/602; 318/603
(58) Field of Search ................................ 318/602–605, 318/715, 721, 799, 806; 341/112, 116; 324/207.25, 207.2, 207.21

(56) References Cited

U.S. PATENT DOCUMENTS

| | | | | |
|---|---|---|---|---|
| 4,707,650 A | * | 11/1987 | Bose | 318/685 |
| 5,444,340 A | * | 8/1995 | Tamaki et al. | 318/723 |
| 5,461,293 A | * | 10/1995 | Rozman et al. | 318/603 |
| 5,491,391 A | * | 2/1996 | Bahr et al. | 318/603 |
| 5,530,331 A | * | 6/1996 | Hanei | 318/592 |
| 5,537,020 A | * | 7/1996 | Couture et al. | 318/720 |
| 5,561,355 A | * | 10/1996 | Ideguchi et al. | 318/721 |
| 6,249,095 B1 | * | 6/2001 | Takura | 318/254 |
| 6,486,658 B2 | * | 11/2002 | Naidu | 324/207.21 |
| 6,522,130 B1 | * | 2/2003 | Lutz | 324/207.2 |

FOREIGN PATENT DOCUMENTS

| | | | | |
|---|---|---|---|---|
| JP | 63099793 A | * | 5/1988 | ............ H02P/6/00 |
| JP | 2-228289 | | 9/1990 | |
| JP | 11206198 A | * | 7/1999 | ........... H02P/21/00 |
| JP | 2001-349747 | | 12/2001 | |
| JP | 2001349747 A | * | 12/2001 | .......... G01D/5/244 |

* cited by examiner

Primary Examiner—Edgardo San Martin
(74) Attorney, Agent, or Firm—Nixon & Vanderhye P.C.

(57) ABSTRACT

A rotation angle detecting apparatus for a synchronous rotary electric machine includes an incremental encoder. The incremental encoder generates an index pulse each time electric power is supplied to said plurality of phase-coils and an auxiliary index pulse each time the rotor rotates 360 degrees.

6 Claims, 8 Drawing Sheets

REVERSAL

Figure 1A:
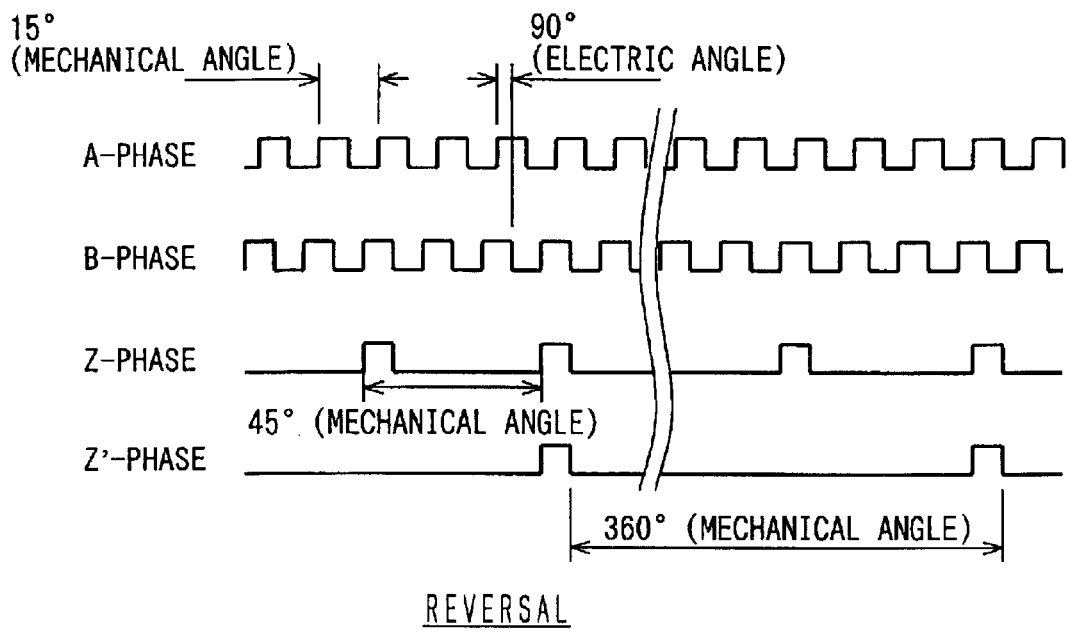

NORMAL

ROTATION ANGLE DETECTING APPARATUS FOR SYNCHRONOUS ROTARY ELECTRIC MACHINE

CROSS REFERENCE TO RELATED APPLICATION

The present application is based on and claims priority from Japanese Patent Application 2002-166198, filed Jun. 6, 2002, the contents of which are incorporated herein by reference.

BACKGROUND OF THE INVENTION

1. Field of the Invention

The present invention relates to a rotation angle detecting apparatus that includes an incremental encoder for detecting rotation angle of a synchronous rotary electric machine such as a synchronous ac generator or a synchronous motor.

2. Description of the Related Art

Such an incremental encoder is a relative rotation angle detector that detects an index pulse generated each rotation of a rotor of a rotary machine, thereby detecting a rotation angle of the rotor relative to the stator of the rotary machine.

However, it is impossible to know an incremental rotation angle or an absolute rotation angle of the rotor by the incremental encoder, after electric power supply has been cut, until the power supply resumes and an index pulse is generated.

Therefore, a plurality of phase coils (e.g. U-coil, V-coil, W-coil of a three-phase winding) of a rotary electric machine have to be alternately powered at certain nonsynchronous time intervals until the index pulse is generated after power supply resumes. Because the index pulse is generated only once each rotation, only way to start the synchronous operation is to wait until the rotor makes one turn (360 degrees), at the maximum, after power is supplied to the rotary electric machine.

SUMMARY OF THE INVENTION

Therefore, a main object of the invention is to provide a rotation angle detecting apparatus that can reduce the waiting time after power is supplied to the synchronous rotary electric machine until the synchronous operation thereof starts.

According to a main feature of the invention, a rotation angle detecting apparatus for a synchronous rotary electric machine includes an incremental encoder. The incremental encoder generates an index pulse each time electric power is supplied to all the plurality of phase-coils.

Therefore, synchronous operation of the synchronous rotary electric machine can be carried out as soon as the synchronous electric machine is supplied with electric power. As a result, desired torque and/or output power can be obtained in a very short time after the synchronous rotary electric machine is operated.

In addition, the incremental encoder can generate an auxiliary index pulse each time the rotor makes one turn or turns 360 degrees. Therefore, an absolute rotary angle of the rotor can be detected.

Preferably, the incremental encoder is disposed to be coaxial with the rotor and comprises a permanent magnet polarized to have a plurality of magnetic poles in a rotation direction and a magnetic sensor for detecting a change in magnetic flux supplied by the permanent magnet. Therefore, the incremental encoder can be made comparatively thinner.

The above synchronous rotary electric machine includes a speed reduction unit, so that the rotation angle of the rotor can be detected without a specific rotation sensor mounted in the output shaft of the speed reduction unit.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIGS. 1A and 1B are timing diagrams showing voltage wave-shapes of a plurality of phase coils of a rotation angle detecting apparatus according to a preferred embodiment that is mounted in a rotary electric machine;

FIG. 2 is a schematic diagram of a gearshift system of a motor car which includes the rotation angle detecting apparatus according to the preferred embodiment;

FIG. 3 is a schematic cross-sectional plan view of a synchronous rotary electric machine to which the rotation angle detecting apparatus is applied;

FIG. 4 is a cross-sectional side view of a servo unit that includes the rotary electric machine shown in FIG. 3, a speed reduction unit and an encoder of the rotation angle detecting apparatus according to the preferred embodiment of the invention;

FIG. 5 is a perspective view of an assembly of a parking unit and a gearshift unit driven by the servo unit shown in FIG. 4;

FIG. 6 is a cross-sectional plan view of the synchronous rotary electric machine with the a permanent magnet of the rotation angle detecting apparatus;

FIG. 7 is a schematic diagram showing magnetized areas of the permanent magnet shown in FIG. 6;

FIG. 8 is a schematic diagram of magnetic sensors mounted on a circuit board of the rotation angle detecting apparatus;

FIGS. 9A, 9B are graphs showing operation of the rotation angle detecting apparatus; and FIG. 10 is a flow diagram showing a process of operation of the rotation angle detecting apparatus.

DETAILED DESCRIPTION OF THE PREFERRED EMBODIMENTS

A rotation angle detecting apparatus according to a preferred embodiment of the invention that is applied to a gearshift unit having a parking unit will be described below with reference to the appended drawings.

As shown in FIG. 2, the gearshift unit includes a rotary electric machine 1, a speed reduction unit 2, a gearshift unit 3, an incremental encoder (hereinafter referred to the encoder) 4 and a control circuit 5. The rotary electric machine 1, the speed reduction unit 2 and the encoder 4 form a servo unit, as shown in FIG. 4.

The rotary electric machine 1 is a synchronous motor, which will be described with reference to FIGS. 3 and 4.

As shown in FIG. 3, the rotary electric machine is composed of a rotor 6 and a stator 7. The rotor 6 includes a rotary shaft 8 and a rotor core 9. The rotary shaft 8 is rotatably supported by a front and rear bearings 10, 11.

The speed reduction unit 2 includes an output shaft 12, and the front bearing 10 is held by the inner wall of the output shaft 12. The servo unit includes a front housing 13, a rear housing 15 and a metal bearing 14 that rotatably supports the output shaft 12, so that the rotary shaft 8 is rotatably supported by the metal bearing 14, the output shaft 12 and the front bearing 10. The rear bearing 11 is held by the inner wall of the rear housing 15 to rotatably support the rear end of the rotary shaft 8.

The stator 7 includes a stator core 16 and a coil unit 17 that is composed of a plurality of coils 17a–17l. The stator core 16 includes teeth 18a–18l, around which the coils 17a–17l are respectively wound. The coils 17a, 17d, 17g, 17j form a U-phase winding, the coils 17b, 17e, 17h, 17k form a V-phase winding, and the coils 17c, 17f, 17i, 17l form a W-phase winding.

Figure 3:
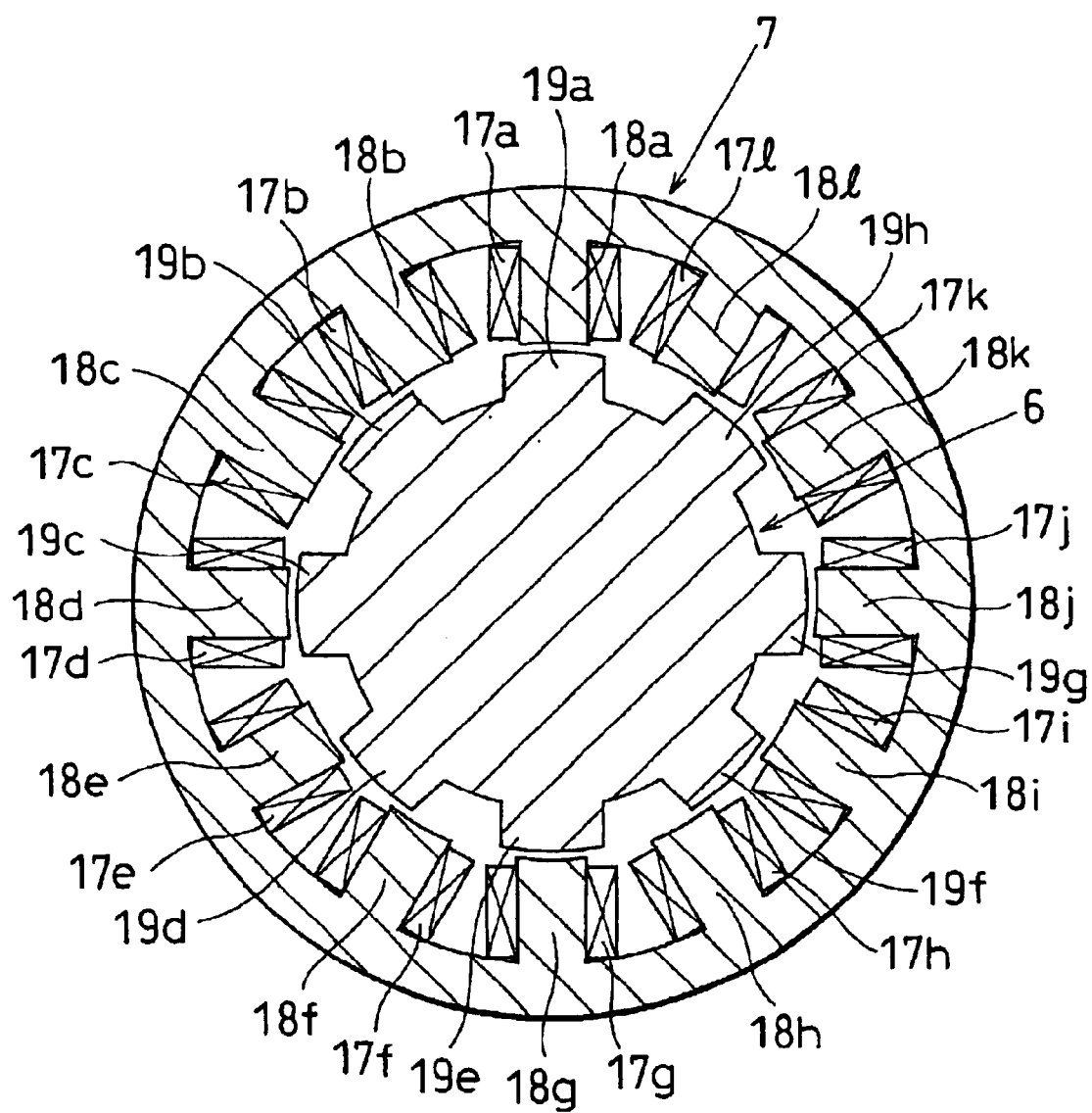

The rotor core 9 includes a plurality of salient poles 19a–19h. When electric power is supplied to the phase windings alternately in the order of W, V and U, the rotor 6 rotates counterclockwise in FIG. 3. On the other hand, the rotor 6 rotates clockwise when electric power is supplied to the phase windings in the order of V, W and U. The rotor rotates 45 degrees in angle each time the electric power is supplied to each of the phase windings U, V, W.

Figure 4:
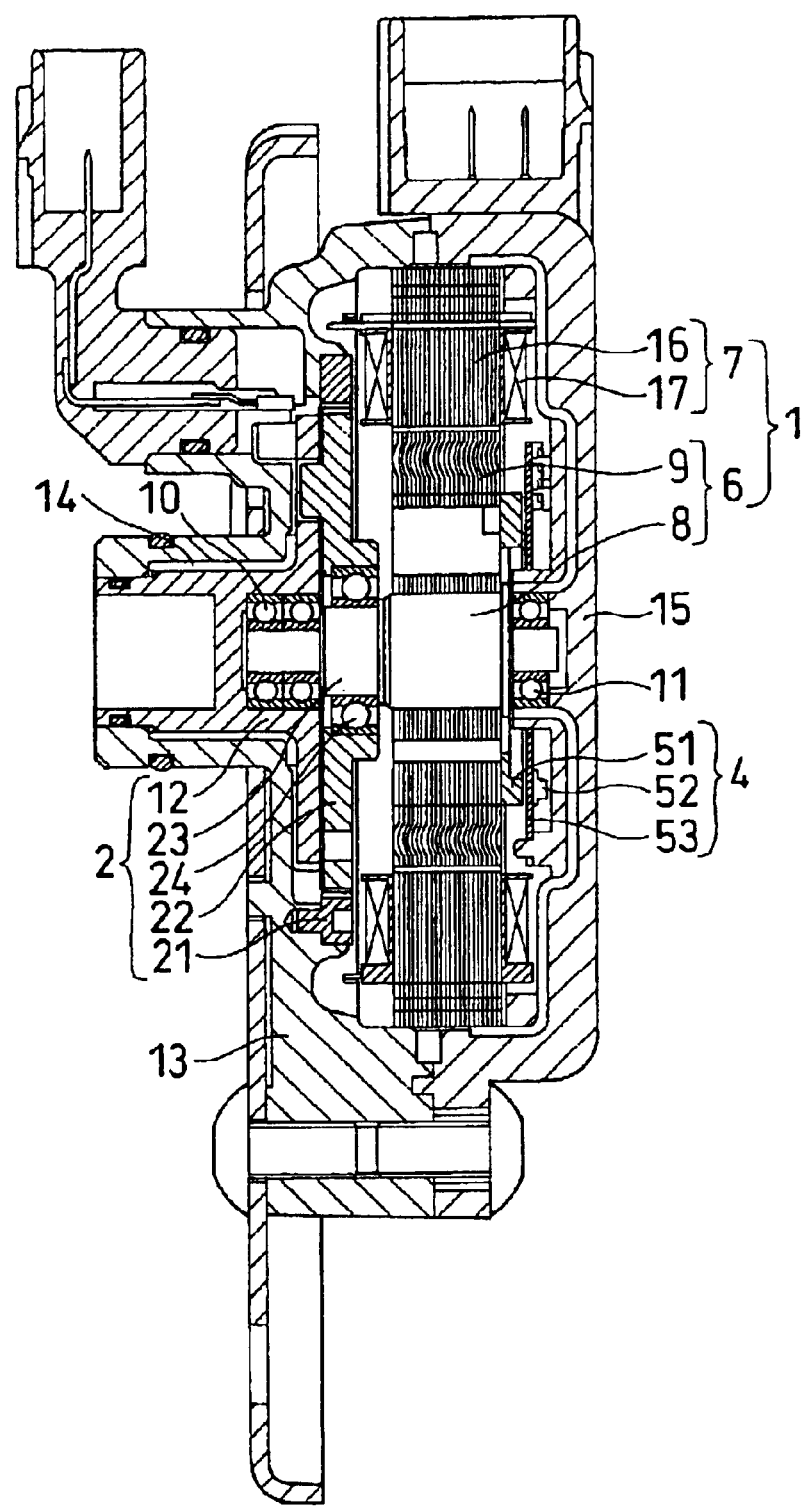
Figure 5:
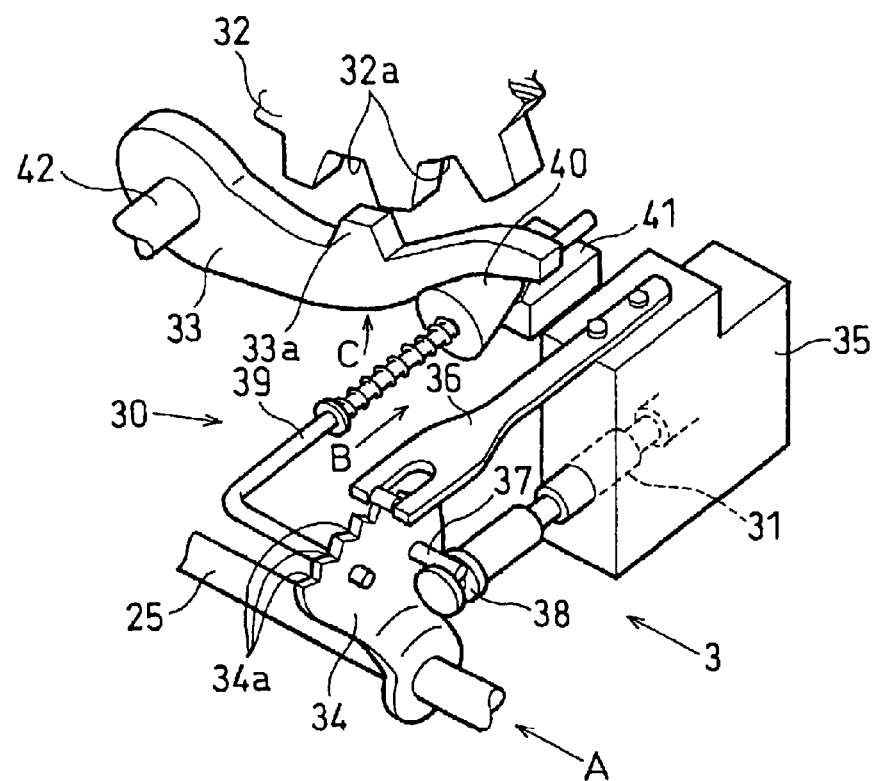
Figure 6:
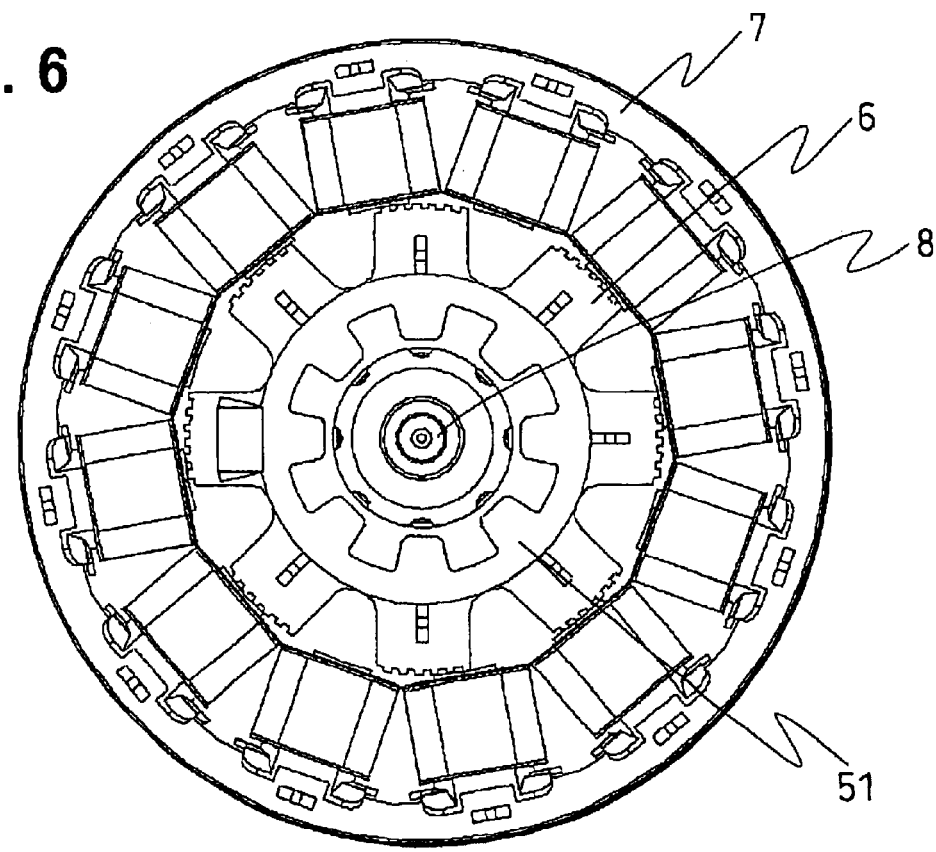

The speed reduction unit 2 is a cycloid type and includes an internal gear 21, an external gear 22 and the output shaft 12, as shown in FIG. 4. The internal gear 21 is held by the front housing 13. The rotary shaft 8 has an eccentric portion 23, on which the external gear 22 is rotatably supported via a bearing 24, so that the external gear 22 rotates eccentrically when the rotary shaft 8 rotates. Accordingly, the external gear 22 rotates at a reduced rotation speed, which is transmitted to the output shaft 12. As shown in FIG. 5, the gearshift unit 3 includes a control rod 25, a parking unit 30 and a manual spool valve 31. The control rod 25 is connected to the output shaft 12.

The gearshift unit 3 is driven by the output shaft 12 so that gear shifting from one range to another among respective shift ranges P, R, N and D can be carried out when the manual spool valve 31 is moved.

The parking unit 30 includes a parking gear 32 that has notches 32a between gear teeth, a park pole 33 that has a projection 33a, a fan-shaped detent plate 34, an oil-pressure control box 35 and a fork-shaped blade spring 36. The park parking unit 30 locks a vehicle when the projection 33a of the park pole 33 engages one of the notches 33a of the parking gear 32, and unlocks the vehicle when the projection 33a disengages from the notch 33a.

The parking gear 32 is connected to an output shaft of an automatic transmission unit via a differential gear unit (not shown). The vehicle is locked when wheels of the vehicle are locked, and the wheels are locked when the parking gear 32 is locked.

The control rod 25 carries the detent plate 34 thereon. The detent plate 34 has a plurality of notches 34a on the arc-shaped periphery thereof. The blade spring 36 has a pin across the forked portion thereof to fit in one of the notches 34a, thereby, holding the detent plate 34 in a selected gearshift range. The blade spring 36 is fixed to the oil-pressure control box 35 at an end opposite the forked portion.

The detent plate 34 has a pin 37 and a parking rod 39. The pin 37 fits in an annular groove formed at an end of the manual spool valve 31 to drive the same. When the detent plate 34 is rotated by the control rod 25, the pin 37 is driven in an arc, so that the manual spool valve 31 moves straight in the oil-pressure control box 35. If the control rod 25 rotates clockwise when viewed from position A in FIG. 5, the pin 37 pushes the manual spool valve 31 into the pressure control box 35 to change pressure-oil passages so that the gear shifting can be carried out in the order of D, N, R and P On the other hand, the pin 37 pulls the manual spool valve 31 to change the gearshift in the order of P, R, N and D, if the control rod 25 rotates counterclockwise.

The parking rod 39, which is fixed to the detent plate 34, has a conical head 40 between a projection 41 of a transmission housing and the parking pole 33.

If the control rod 25 rotates clockwise to change the gear range from R to P, the parking rod 39 moves in direction B, so that the conical head raises the parking pole 33. Accordingly, the parking pole 33 turns about an axis 42 in the direction indicated by an arrow C, so that the projection 33a of the parking pole 33 fits in one of the notches 32a of the parking gear 32. Thus, the parking unit 30 can locks the vehicle in the parking range.

If the control rod 25 rotates counterclockwise to change the range from P to R, the parking rod 39 is moved in the direction opposite the direction indicated by the arrow B, so that the biasing force that raises parking pole 33 disappears. Because the parking rod 33 is biased in the direction opposite the direction indicated by an arrow C, the projection 33a of the parking pole 33 disengages from the notches 32a of the parking gear 32. As a result, the parking gear 32 becomes free, and the parking unit 30 unlocks the vehicle from the parking range.

Figure 7:
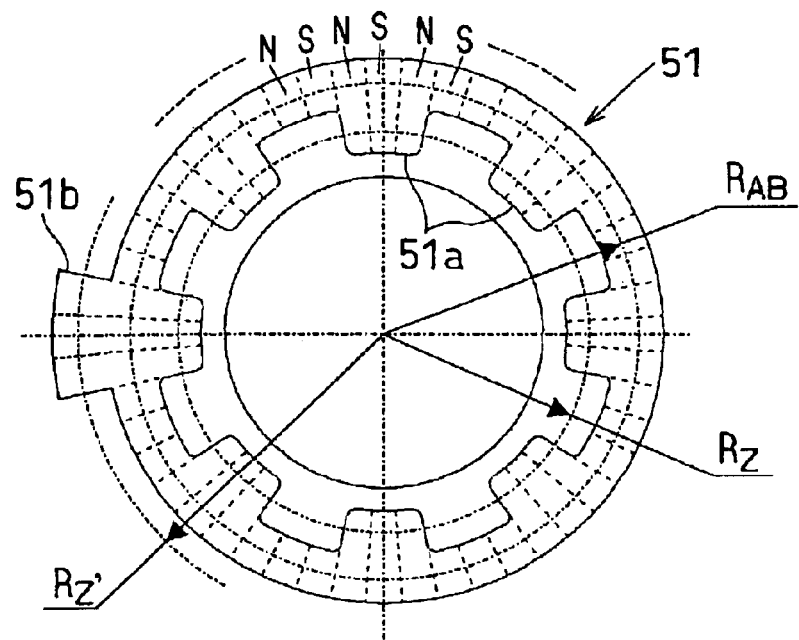

As shown in FIG. 4, the encoder 4 includes a permanent magnet 51 and a magnetic flux change detector unit 52. The permanent magnet 51 is a ring-shaped plate fixed, coaxially with the rotary shaft, to the rotor 6. As shown in FIG. 7, the permanent magnet 51 is magnetized to have a plurality of N and S poles alternately formed on a circular zone whose center radius is $R_{AB}$ at intervals of 7.5 degree in angle. The magnetic flux change detector 52 includes first to fourth detecting elements 52a, 52b, 52z and 52z'.

The permanent magnet 51 has a plurality of inwardly projecting internal teeth 51a at 45 degree-intervals and an outwardly projecting external tooth 51b. The central portion of each internal tooth 51a is magnetized to form an S-pole, and the circumferentially opposite sides of the central portion are magnetized to form N-poles. The magnetic poles formed at a circular zone whose radius is $R_Z$ are magnetic poles for generating a Z-phase voltage or an index pulse. The circumferentially central portion of the external tooth 51b is also magnetized to form an S pole and the circumferentially opposite sides of the central portion are magnetized to form N-poles. The magnetic poles formed at a circular portion whose radius is $R_Z'$ are magnetic poles for generating a Z'-phase voltage or an auxiliary index pulse.

Figure 8:
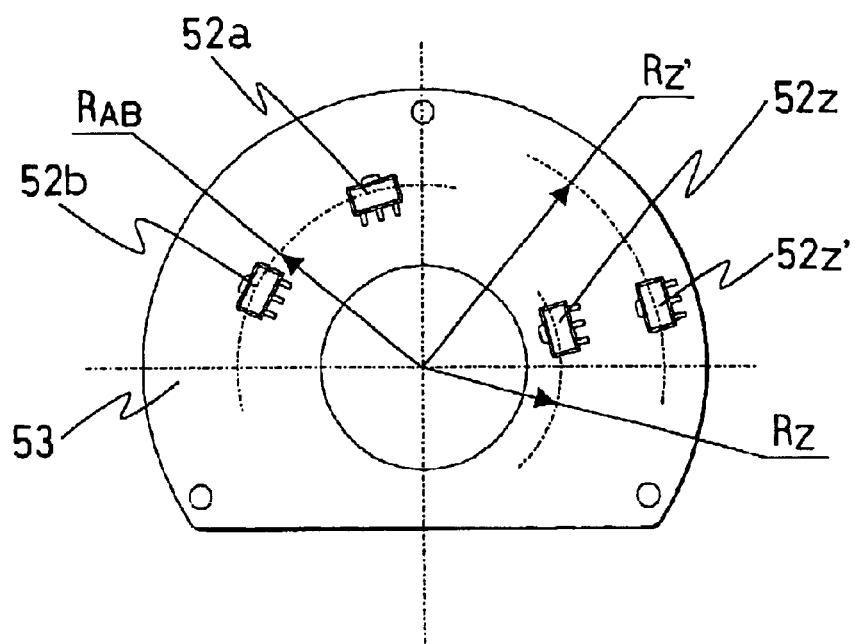

The first to fourth detecting elements 52a, 52b, 52z, 52z' are elements of the magnetic flux change detector 52 are elements for detecting magnetic flux change such as hall ICs, hall elements or MR(magneto-resistive)-ICs fixed to a circuit board 53, as shown in FIGS. 4 and 8.

The first and the second detecting elements 52a, 52b are disposed at different positions on a circle that has radius $R_{AB}$ to respectively detect flux changes of a radially middle portion of the permanent magnet 51, thereby providing A-phase and B-phase output signals. The third detecting element 52z is disposed on a circle having radius $R_Z$ to detect a flux change of a radially inner portion of the permanent magnet 51 that includes the internal teeth 51a, thereby providing a Z-phase output signal or the index signal. The fourth detecting element 52z' is disposed on a circle having radius $R_{Z'}$ to detect a flux change of a radially outer portion of the permanent magnet 51 that includes the external teeth 51b, thereby providing a Z'-phase output signal or the auxiliary index signal.

Figure 1B:
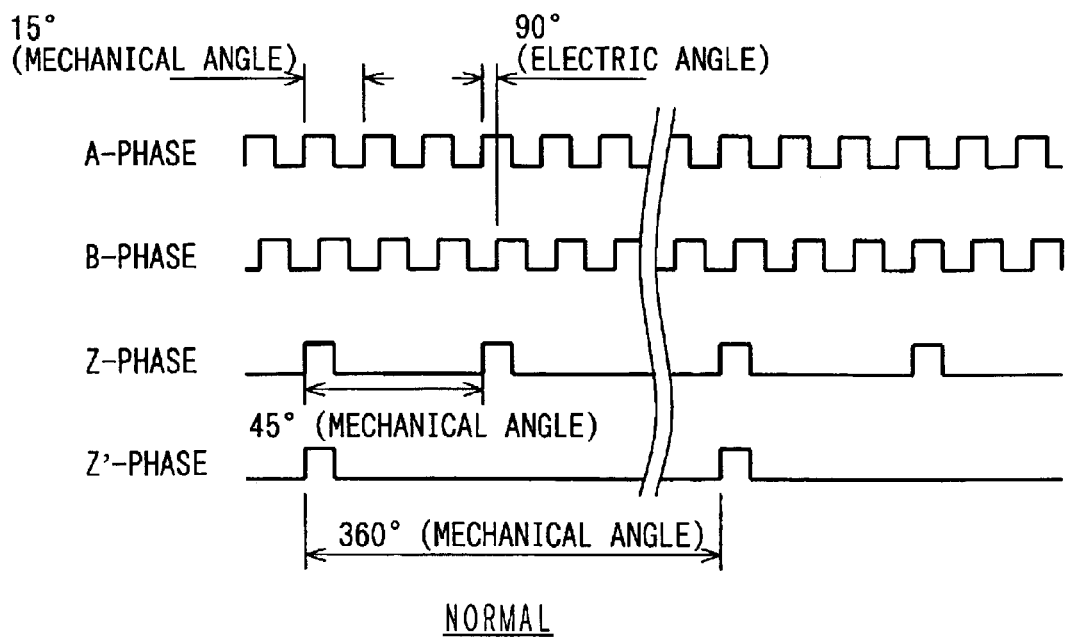
Figure 2:
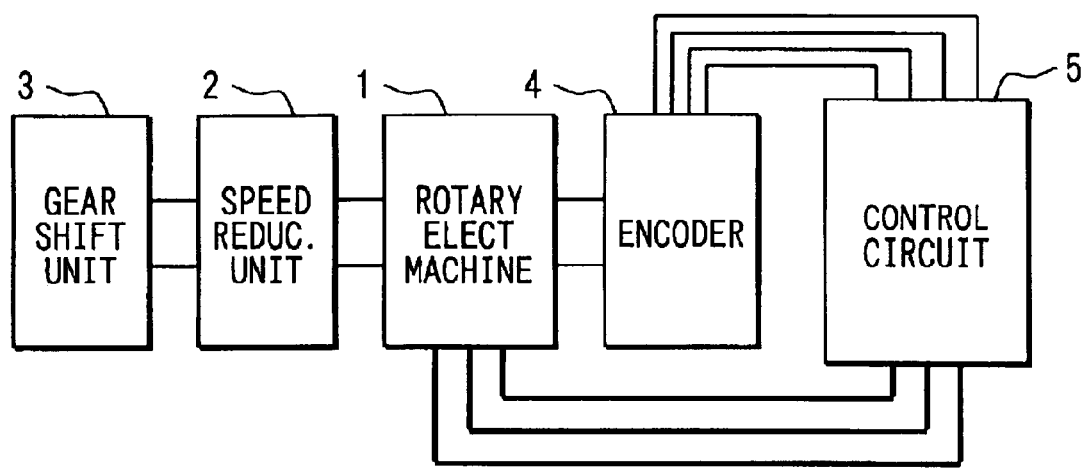

As shown in FIG. 1A showing output signals of the phase windings at reversal rotation and FIG. 1B showing output signals of the phase windings at normal reversal rotation, the A-phase output signal and the B-phase output signal axe signals that are 90 degrees in phase different from each other. That is, the pair of output signals can be provided each time the rotor 6 turns 15 degrees in mechanical angle.

The Z-phase output signal is provided each time the rotor 6 turns 45 degrees in mechanical angle to define the turn-on timing and the relationship between the A-phase output signal and the B-phase output signal. The Z'-phase output signal is provided each time the rotor 6 turns 360 degrees in mechanical angle to define the relative rotational position of the rotor 6 to the stator 7.

The control circuit 5 controls rotation of the rotary electric machine 1 thereby controlling the gearshift unit 3 that is driven by the speed reduction unit 2. The encoder 4 detects the rotational position of the rotor 6 to control the rotation of the rotary electric machine 1. That is, the control circuit 5 counts the number of pulses of the A-phase, B-phase, Z-phase and Z'-phase output signals to detect the relative rotational position of the rotor 6 to the stator 7.

Figure 9A:
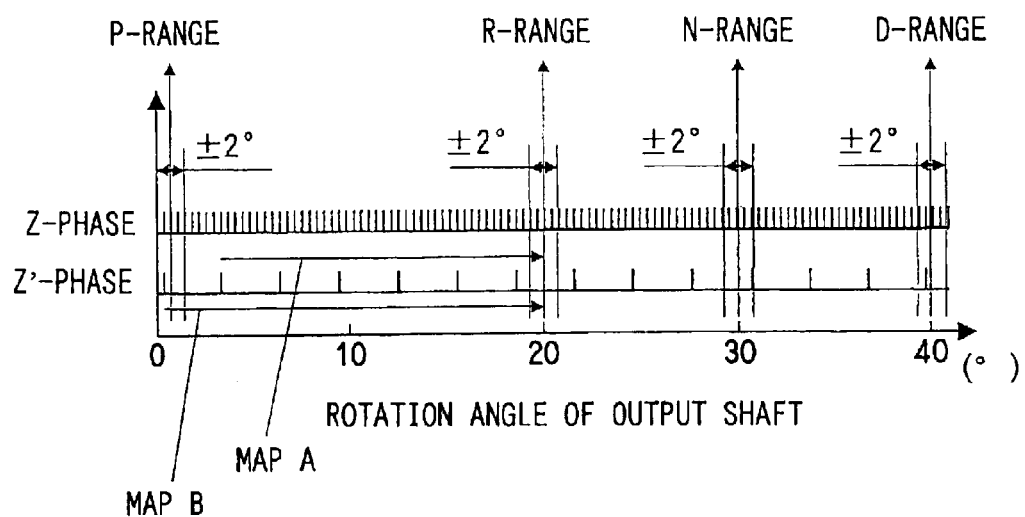
Figure 9B:
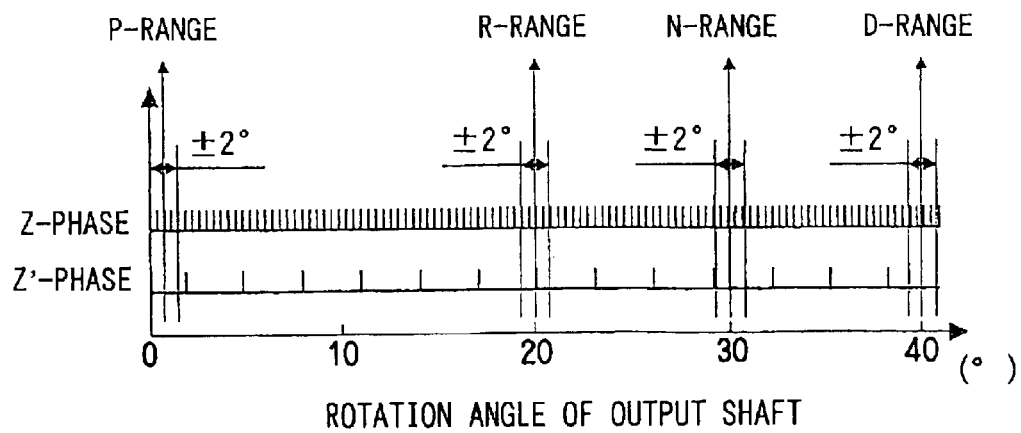

As shown in FIG. 9, there are four gearshift ranges, P, R, N and D, each of which has a marginal area (or the marginal rotation angle of the output shaft 12) of ±2 degrees in angle. There are restriction walls that restrict further turn of the output shaft 12 outside the P-range and the D-range.

Figure 10:
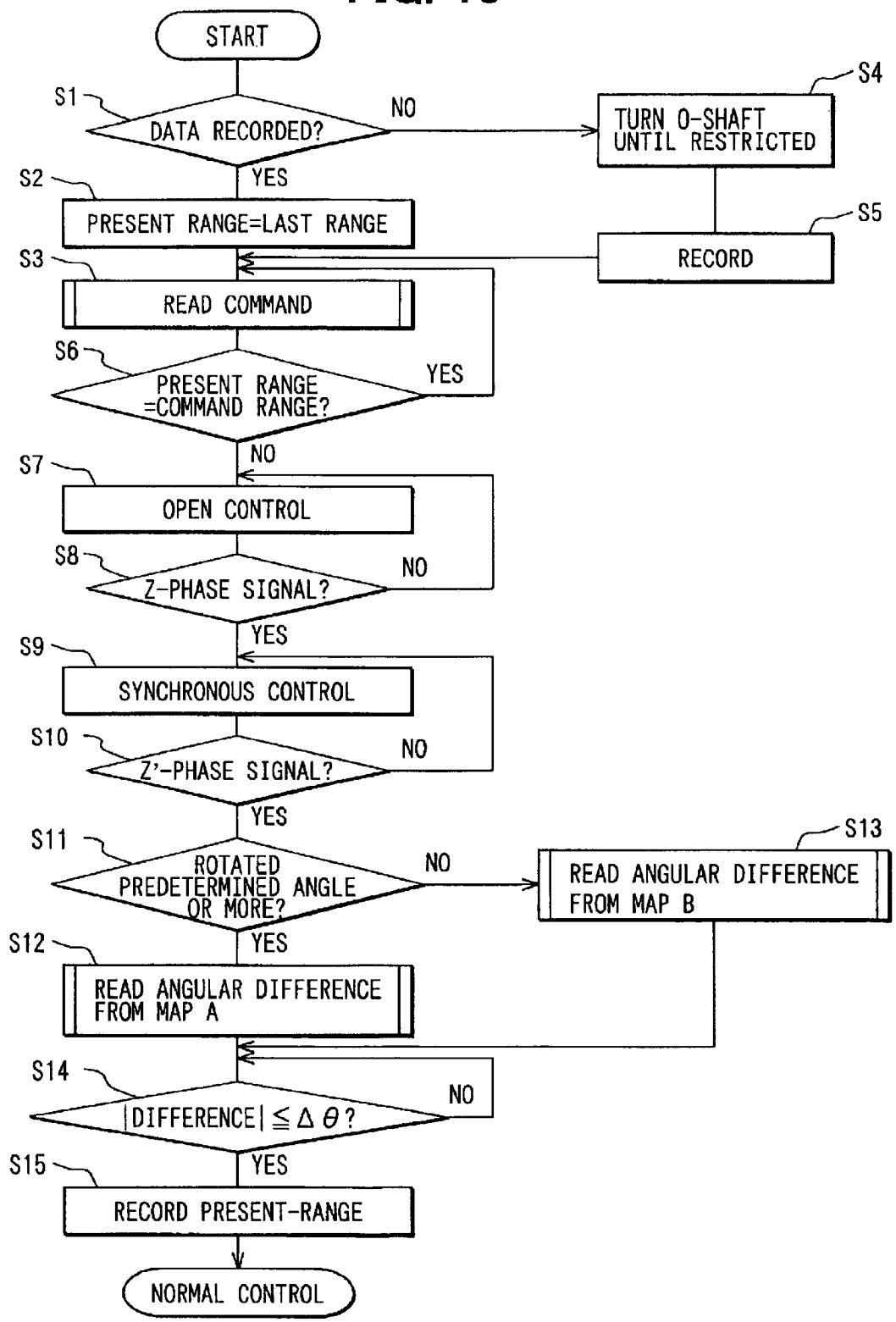

As shown in FIG. 10, when a switch is turned on to start the control circuit 5, whether or not data of the last operation were recorded in a memory is examined at step S1. If the result is YES, the last gearshift range is continued to be a present gearshift range at step S2, and the process proceeds to step S3, where a gearshift command signal that is given when a manual lever is moved is read. If the result is NO, the rotary electric machine 1 is driven to turn the output shaft 12 until it is restricted by one of the restriction walls at step S4. Then, the present gearshift position (P-range or D-range) of the rotary electric machine 1 is recorded in the memory at step S5 to proceed to step S3.

Then, whether or not the present gear range meets the command signal is examined at step S6. If the result is YES, the process returns to step S3. That is, the command signal is read repeatedly until another gearshift range is given by the manual lever. On the other hand, the rotary electric machine 1 is driven to turn the output shaft 12 to the gearshift range commanded by the command signal at step S7, if the result of step S6 is NO. For this purpose, electric current is supplied to the U-phase, V-phase and W-phase coils 17a–17l alternately at certain intervals in an open controlled manner so that the electric rotary machine can be prevented from running randomly. During this operation, whether the Z-phase signal (index pulse) is present or not is examined at step S8.

If the result of step S8 is NO, the process returns to step S7 to continue the open control of the rotary electric machine 1. On the other hand, synchronous operation is started by supplying current to the most suitable phase coils for the rotational position of the rotor 6 relative to the stator 7 at the time when the Z-phase signal is inputted at step S9.

Subsequently, whether the Z'-phase signal is inputted or not is examined at step S10. If the result is NO, the process returns to step S9 to continue the synchronous operation of the rotary electric machine 1 until the Z'-phase signal is inputted. If the result is YES, whether or not the rotor 6 turns as far as a predetermined rotation angle is examined at step S11.

If the result of the step S11 is YES, a difference in rotation angle between the present angular position and the commanded angular position is read from a map A that is mounted in the control circuit 5 at step S12. If the result of the step S11 is NO, a difference in rotation angle between the present angular position and the commanded angular position is read from a map B that is also mounted in the control circuit 5 at step S13.

Thereafter, whether or not the absolute value of the difference read from either the map A or the map B is equal to or smaller than a predetermined value $\Delta\theta$ is examined at step S14.

If the result of the step S14 is YES, it is considered that the present gearshift range is the commanded gearshift range. Therefore, power supply to the rotary electric machine 1 is cut off, and the present gearshift range is recorded into the memory at step S15. Thereafter, normal synchronous operation of the rotary electric machine 1 is started.

While electric power is not supplied to the rotary electric machine, the gearshift range is held by the detent unit that includes the detent plate 34 and the blade spring 36. However, it is impossible to know an accurate angular position of the rotor 1 because the rotor 6 is not locked. For example, the P-range corresponds to ±2 degrees in rotation angle of the output shaft 12 of the speed reduction unit 2. This rotation angle corresponds to ±120 degrees in rotation angle of the rotor 6. If the output shaft 12 is positioned at 0 degree in rotation angle, the output shaft 12 should be turned by 20 degrees in order to change the gearshift from the P-range to the R-range. On the other hand, the output shaft 12 should be turned by 17 degrees if the rotation angle of the output shaft 12 is positioned at 3 degrees.

In order to know the angular position of the output shaft 12, a rotation angle of the output shaft 12 from the wall of the P-range or D-range at which Z-phase signal is generated is experimentally detected beforehand and recorded into a map, which is mounted in the control circuit 5.

As shown in FIG. 9A, the first Z'-phase signal is generated when the output shaft 12 turns from the wall of the P-range by 0.75 degree, and the next Z'-phase signal is generated when the output shaft 12 turns by 6.75 degrees. For example, if the first Z'-phase signal is generated before the output shaft 12 has turned by 0.75 degree, in which the rotor 6 has not turned by 45 degrees, while the gearshift is at the P-range, it is considered that the output shaft 12 was previously positioned within 0.75 degree in angular position from the wall of the P-range. Accordingly, it can be understood that the output shaft 12 should be turned by 19.25 degrees from the position where the first Z'-phase signal is generated in order to change the gearshift from the P-range to R-range. If the first Z'-phase signal is generated after the output shaft has turned by 0.75 degree while the gearshift is at the P-range, it is considered that the output shaft was previously positioned in an angular range between 0.75 degree and 4 degrees. Accordingly, it can be understood that the output shaft 12 was positioned at 6.75 degrees from the wall of the P-range when the Z'-phase signal was first generated. Therefore, the output shaft 12 should be turned by 13.25 degrees from where the Z'-phase signal is first generated, in order to change the gearshift from the P-range to the R-range.

The above idea is substantially the same with the gearshift from the P-range to a range other than the R-range and from one range to another. Even if the relative angular position of the gearshift range to the Z'-phase signal changes, the above idea can be applied to the gearshift control. Thus, the transition from the open or nonsynchronous operation to the synchronous operation can be carried out before the rotor 6 has turned by 45 degrees in angle.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A rotation angle detecting apparatus for a multi-phase synchronous rotary electric machine which includes a stator having a plurality of phase-coils and a rotor having a prescribed number of salient poles thereby operating cyclically, said rotation angle detecting apparatus comprising:

a ring-shaped magnetic flux supply member, fixed to said rotor, having a first number of first magnetic flux supply poles alternately disposed on a first circular zone at equal intervals and a second number of second magnetic flux supply poles disposed on a second circular zone at equal intervals; and a magnetic flux change detector, fixed to said stator, having a first detecting element disposed at a first position on said first circular zone to provide an A-phase signal when it detects flux of said first magnetic flux supply poles, a second detecting element disposed at a second position that corresponds to 90 degrees in phase difference from said A-phase signal on said first circular zone to provide a B-phase signal when it detects flux of said first magnetic flux supply poles, and a third detecting element disposed at a prescribed position on said second circular zone to provide an index pulse when it detects flux of said second magnetic flux supply poles;

wherein said second number is equal to said prescribed number, thereby generating said index pulse each cycle period in which each of said phase-coils fully operates.

2. The rotation angle detecting apparatus as claimed in claim 1, wherein said magnetic flux supply member further comprises a third magnetic flux supply pole disposed on a third circular zone, and said magnetic flux detector further comprises a fourth detecting element disposed at a prescribed position on said third circular zone to provide an auxiliary index pulse when it detects flux of said third magnetic flux supply pole, thereby generating an auxiliary index pulse each time said rotor turns 360 degrees in mechanical angle.

3. The rotation angle detecting apparatus as claimed in claim 1, further comprising a control circuit for always supplying electric power to said phase coils, wherein said control circuit supplies electric power in synchronism with the rotation of said rotor when detecting said index pulse.

4. The rotation angle detecting apparatus as claimed in claim 1, wherein said magnetic flux member is disposed to be coaxial with said rotor and comprises a permanent magnet polarized to have a plurality of magnetic poles.

5. The rotation angle detecting apparatus as claimed in claim 1, wherein said synchronous rotary electric machine comprises a speed reduction unit.

6. The rotation angle detecting apparatus as claimed in claim 2, further comprising a first memory for recording a present angular position and a second memory unit for recording a difference between the present angular position and a commanded angular position, wherein a control circuit records the present angular position when the difference between the present angular position and the commanded angular position is equal to or smaller than a predetermined angle.

* * * * *